United States Patent [19]

Paleari et al.

[11] Patent Number: 5,843,581
[45] Date of Patent: Dec. 1, 1998

[54] BARRIER BLEND AND FOOD PACKAGING FILM CONTAINING THE BLEND

[75] Inventors: Mario Paleari; Tito Fornasiero, both of Milan, Italy

[73] Assignee: Cryovac, Inc., Duncan, S.C.

[21] Appl. No.: 905,920

[22] Filed: Aug. 4, 1997

Related U.S. Application Data

[63] Continuation of Ser. No. 556,973, filed as PCT/US94/06275, Jun. 3, 1994 published as WO94/29384, Dec. 22, 1994, abandoned.

[30] Foreign Application Priority Data

Jun. 3, 1993 [EP] European Pat. Off. .............. 93304312

[51] Int. Cl.⁶ ..................................................... B32B 27/08
[52] U.S. Cl. ......................... 428/518; 428/516; 428/522; 428/523; 525/185
[58] Field of Search .......................... 528/185; 428/35.4, 428/522, 516, 518, 523

[56] References Cited

U.S. PATENT DOCUMENTS

| | | | |
|---|---|---|---|
| 3,780,140 | 12/1973 | Hammer. | |
| 4,123,585 | 10/1978 | Sparzak et al. | 428/379 |
| 4,489,193 | 12/1984 | Goswami | 525/190 |
| 4,613,533 | 9/1986 | Loomis et al. | 428/36 |
| 4,687,805 | 8/1987 | White | 524/569 |
| 4,910,253 | 3/1990 | Lancaster et al. | 525/60 |
| 4,950,718 | 8/1990 | Burgert et al. | 525/185 |
| 5,202,188 | 4/1993 | Bekele | 428/414 |

FOREIGN PATENT DOCUMENTS

WO 90/13600  11/1990  WIPO.

*Primary Examiner*—Mark L. Warzel
*Attorney, Agent, or Firm*—David G. Burleson

[57] ABSTRACT

A copolymer blend comprising vinylidene chloride-vinyl chloride copolymer, vinylidene chloride-methyl acrylate copolymer or a mixture thereof, from 2 to 20% by weight of CO-modified ethylene vinyl acetate copolymer or CO-modified ethylene alkyl acrylate copolymer and preferably up to 5%, of a plasticizer and/or stabiliser, relative to the total weight of the blend is useful as a barrier layer in a multi-layer film for packaging food such as cheese. A multi-layer film comprising such a blend, a method of producing such a blend or multi-layer film and a package or bag formed from the film.

20 Claims, No Drawings

BARRIER BLEND AND FOOD PACKAGING FILM CONTAINING THE BLEND

This is a continuation of application Ser. No. 08/556,973 filed as PCT/US94/06275, Jun. 3, 1994, published as WO94/29384 Dec. 22, 1994, abandoned concurrently herewith.

The present invention relates to new blends of vinylidene chloride copolymers suitable for use as a barrier layer in a packaging film for example for packaging cheese. The invention further relates to a multilayer film comprising such a blend as a barrier layer, and a package comprising the film, and also to methods of producing the blend and film.

In the packaging of cheese and other foodstuffs, shrink wrap film is frequently used to protect the foodstuff from handling and decomposition during storage and transport. Suitable films for packaging most sorts of cheese require a compromise between permeability both to oxygen and to carbon dioxide. It is firstly necessary to have a low oxygen permeability in order to prevent contact of the air with cheese which leads to the growth of mould on the cheese and the oxidation of fat in the cheese which would lead to a rancid taste. However, in the case of many cheeses, a partial fermentation takes place after the cheese is packaged and in such cases, it is necessary for the film to be permeable, to at least a degree, to carbon dioxide in order to prevent a build up of carbon dioxide in the package. Similar considerations apply in relation to other foodstuffs which release carbon dioxide after being packaged, for example some processed meats.

Films which are currently used to package cheese comprise a barrier layer of vinylidene chloride-vinyl chloride copolymer. This layer comprises in addition plasticizer or stabiliser such as epoxidised soyabean oil in order to modify the physical properties of the barrier layer including permeability. The plasticizer or stabiliser is added as a liquid and it may be necessary for the liquid to form about 10% of the blend used to form the barrier layer in order to obtain the desired permeability properties for packaging cheese. For example IT-A-1168173 (Grace Italiana) discloses a film comprising a vinylidene chloride copolymer barrier layer in which a plasticiser may be used to control the permeability of the film. Typically the barrier layer comprises from 6 to 10% by weight of polymeric plasticiser.

The use of a large amount of such a liquid leads to difficulties in the production of the blend used to form the barrier layer. For example, it is necessary to blend the liquid with the vinylidene chloride copolymer over a long period of time (for example 14 to 18 hours). presence of such a large amount of liquid in the blend can lead to a loss of homogeneity and to coagulation. This makes it necessary to delump the blend by performing a crushing operation. Moreover, variations in the homogeneity in the blend caused by this can lead to wide variations in the permeability of the barrier film and a standard deviation of as much as 15% in the permeability of the final packaging film can result. Clearly, this level of variation is undesirable. The use of a liquid in large amounts also leads to potential difficulties caused by migration of the liquid from the barrier layer into other layers of the packaging film and, possibly, into the packaged product, and also to potential delamination of multilayer packaging film.

Surprisingly, it has now been found that a new form of barrier layer can be produced using a vinylidene chloride copolymer blend containing a solid Co-modified ethylene vinylacetate or alkylacrylate terpolymer additive which modifies the permeability of the film and allows use of a significantly lower amount of liquid additive.

It is believed that the use of this terpolymer solid additive will therefore overcome one or more of the disadvantages discussed above which are caused by the use of a large quantity of liquid. In particular, use of the CO-modified terpolymer additive allows control of permeability in a polyvinylidene chloride film, while reducing by as much as 50% the time required on a large scale for blending liquid with the vinylidene chloride copolymer and avoiding the need for any delumping operation. While the reduction in blending time is not substantial under some conditions, such as in a high shear blender used on a small scale, a substantial reduction in blending time is obtainable on a large scale for example under low shear conditions.

CO-modified terpolymers are disclosed in U.S. Pat. No. 3,780,140 (Du Pont) which disclose ethylene/vinylacetate/CO terpolymers which may be blended with polyvinyl chloride to provide a molding resin suitable to produce flexible films and rigid or semi-rigid articles. Similarly WO 90/13600 (Du Pont) discloses ethylene/alkylacrylate/CO terpolymers as plasticisers which improve the processability of polyvinyl chloride. Blends of such terpolymers with polyvinyl chloride may use to produce smooth calendered sheets suitable for use in producing instrument panel skins, pond liners or roofing membranes.

However, to the Applicants' knowledge, there has been no suggestion that such terpolymers be used to modify the permeability of polyvinylidene chloride copolymer films.

Accordingly, the present invention provides a copolymer blend comprising vinylidene chloride-vinyl chloride copolymer (VDC-VC), vinylidene chloride-methyl acrylate copolymer (VDC-MA), or a mixture thereof and from 2 to 20% of a CO-modified ethylene vinyl acetate copolymer or a CO-modified ethylene alkylacrylate copolymer, relative to the total weight of the blend.

According to a preferred embodiment of the invention, the blend comprises a mixture of vinylidene chloride-vinyl chloride copolymer and vinylidene chloride-methyl acrylate copolymer comprising from 50 to 80%, more preferably 60 to 70%, by weight vinylidene chloride-vinyl chloride copolymer and from 50 to 20%, more preferably 40 to 30%, by weight vinylidene chloride-methyl acrylate copolymer. Most preferably, the mixture comprises about 65% vinylidene chloride-vinyl chloride copolymer and about 35% vinylidene chloride-methyl acrylate copolymer. The use of a lower percentage of vinylidene chloride-methyl acrylate copolymer can lead to a decrease in thermal stability and use of a higher percentage of vinylidene chloride-methyl acrylate has disadvantages of increased cost.

The vinylidene chloride-vinyl chloride copolymer used in the present invention preferably comprises from 15 to 30%, preferably 20 to 24%, more preferably about 22%, vinyl chloride and from 85 to 70%, preferably 80 to 76%, more preferably about 78%, vinylidene chloride. The vinylidene chloride-vinyl chloride copolymer preferably has a molecular weight from 70,000 to 160,000, more preferably from 90,000 to 140,000. The copolymer generally has a melting point from 136° to 142° C., more preferably 138° to 140° C., and a relative viscosity from 1.40 to 1.70, more preferably 1.50 to 1.60. The vinylidene chloride-vinyl chloride may be produced by either emulsion or suspension polymerisation, though it is preferred that emulsion polymerised material be used.

Relative viscosities referred to in this specification are measured according to ASTM method D2857 using a solution of the resin in tetrahydrofuran.

The vinylidene chloride-methyl acrylate copolymer preferably comprises from 6.5 to 9.5%, preferably 7.5 to 8.5%, more preferably about 8% by weight of methyl acrylate and from 93.5 to 90.5%, preferably 91.5–92.5%, more preferably about 92% by weight of vinylidene chloride. The vinylidene chloride-methyl acrylate copolymer is preferably a suspension polymerised copolymer and preferably has a molecular weight from 80,000 to 140,000, preferably 100,000–120,000. Preferably, the vinylidene chloride-methyl acrylate copolymer has a melting point of about 155° C. and a relative viscosity of about 1.48.

The blend of the invention, further comprises from 2 to 20%, preferably 4 to 15%, more preferably 8 to 14%, by weight of Co-modified terpolymer.

The amount of the CO-modified copolymer may be used to control the permeability of the film. Thus use of a low proportion of CO-modified copolymer, for example of about 4%, provides a low oxygen permeability (about 120 $cm^3$/24hr/$m^2$/bar) and a corresponding low carbon dioxide permeability (about 450 $cm^3$/24hr/$m^2$/bar) suitable for packaging varieties of cheese which produce only a small amount of carbon dioxide. Correspondingly use of a high proportion of CO-modified copolymer, for example about 14%, provides a higher oxygen permeability (about 375 $cm^3$/24hr/$m^2$/bar) and a correspondingly higher carbon dioxide permeability (about 1850 $cm^3$/24hr/$m^2$/bar) suitable for packaging varieties of cheese which produce a large amount of carbon dioxide. Thus the amount of CO-modified copolymer may be used to obtain a desired level of oxygen and carbon dioxide permeability suitable for packaging a particular foodstuff.

Particularly preferred, are those blends which at the barrier thickness used provide an oxygen permeability of about 175, 250 or 375 $cm^3$/24hr/$m^2$/bar and a corresponding carbon dioxide permeability of about 800, 1,400 and 1,850 $cm^3$/24hr/$m^2$/bar.

Such blends may be obtained using about 8, 10 or 14% by weight of CO-modified copolymer additive. It will be appreciated however that the amount of additive required to obtain such permeability may be dependent upon the precise nature of the vinylidene chloride copolymer used: the higher the proportion of vinylidene chloride-methylacrylate which is present the higher the proportion of CO-modified copolymer additive required for a given permeability. The optimum levels of additive may however be determined through routine trial and experimentation.

Preferably, the terpolymer is a CO-modified ethylene vinyl acetate copolymer. Where the terpolymer is a CO-modified ethylene alkyl acrylate copolymer, the alkyl group of the alkyl acrylate generally contains 1 to 4 carbon atoms: such an alkyl acrylate may for example be n-butyl acrylate.

Preferably the CO-modified copolymer has a CO content from 7 to 12%, more preferably 8 to 10%, by weight and a vinyl acetate or alkyl acrylate content from 18 to 40%, more preferably 25 to 30% by weight. The copolymer preferably has a melting point of about 45° C., a molecular weight from 100,000 to 350,000, preferably about 230,000, and a specific density of about 1.0. The copolymer used for blending is generally in powder form and generally has a bulk density from 0.4 to 0.5.

A specific example of a Co-modified copolymer which may be used in the blend of the present invention is Elvaloy 742, produced by Du Pont as an additive for polyvinyl chloride.

The blend of the present invention preferably further comprises up to 5%, preferably from 2 to 4% by weight of a liquid as plasticizer and/or stabiliser relative to the total weight of VDC-VC and/or VDC-MA. As explained above, in accordance with the present invention it is desirable to minimise the amount of plasticizer and/or stabiliser, but it is typically necessary to use about 4% of plasticizer and/or stabiliser. Conventional materials may be used. Examples of suitable materials include epoxidised soyabean oil, epoxidised linseed oil, dibutyl sebacate and glycerol monostearate. The use of epoxidised soyabean oil is preferred.

The present invention further provides a method of producing a blend which method comprises blending vinylidene chloride-vinyl chloride copolymer, vinylidene chloride-methyl acrylate copolymer or a mixture thereof and from 2 to 20% by weight of a CO-modified ethylene vinylacetate copolymer or a CO-modified ethylene alkyl acrylate copolymer relative to the total weight of the blend.

Blending may be performed using conventional techniques at a temperature high enough to soften the polymers for adequate absorption but not so high as to degrade the vinylidene chloride polymer. Generally, blending is performed at a temperature from 60° to 85° C., preferably 70° to 75° C. and under reduced pressure. A liquid, as plasticizer or stabilizer, such as epoxidised soyabean oil, is generally added during the blending step by spraying into the blender at elevated temperature. Typically, the liquid is added at a temperature of 110 to 130, for example about 120° C. Blending is carried out for a sufficient time to homogeneously blend the components and while allowing the components of the blend to cool for example to from 40° to 45° C. Blending may be performed in either a low shear mixer, such as a Patterson or Conaform mixer or in a high shear mixer.

The invention also provides a multilayer film comprising a barrier layer which layer comprises the copolymer blend according to the invention. Such films are preferably heat-shrinkable. They preferably comprise a heat-sealable layer, a barrier layer comprising the blend of the present invention, and an abuse-resistant layer: additional layers may be present.

The invention further provides a process for producing such a multilayer film according to the invention which comprises extruding, for example, the heat-sealable, barrier and abuse-resistant layers and preferably orienting the extruded layers.

The multilayer film of the present invention, comprises, in addition to the barrier layer, a heat-sealable layer and an abuse-resistant layer: additional layers may also be present. The film may further comprise an intermediate or core layer between the heat-sealable and barrier layers so as to provide a four-layer structure. In the four-layer structure, the heat-sealable layer generally has a thickness of from 5 to 30 $\mu$m, preferably about 10 $\mu$m, the core or intermediate layer has a thickness from 15 to 40 $\mu$m, preferably 20 to 30 $\mu$m, more preferably about 25 $\mu$m, the barrier layer has a thickness from 3 to 10 $\mu$m, preferably from 5 to 6 $\mu$m, and the abuse-resistant layer has a thickness from 5 to 30 $\mu$m, preferably about 16 $\mu$m.

In an alternative embodiment the film of the present invention has a five-layer structure. This comprises a heat-sealable layer, a first intermediate or core layer between the heat-sealable and barrier layers, the barrier layer, a second intermediate or core layer between the barrier and abuse-resistant layers and the abuse-resistant layer. In this embodiment, the heat-sealable generally has a thickness from 5 to 15 $\mu$m, preferably about 10 $\mu$m, the first intermediate layer has a thickness from 15 to 35 $\mu$m, preferably about 28 $\mu$m, the barrier layer has a thickness from 3 to 10 $\mu$m, preferably about 5 to 6 $\mu$m, the second intermediate layer has a thickness from 5 to 20 $\mu$m, preferably about 11

μm, and the abuse-resistant layer has a thickness from 3 to 10 μm, preferably about 4 μm.

In a further alternative embodiment the film of the present invention has a six-layer structure. This comprises a heat-sealable layer, first and second intermediate or core layers between the heat-sealable and barrier layers, the barrier layer, a third intermediate or core layer between the barrier and abuse-resistant layers, and the abuse-resistant layer. In this embodiment, the heat-sealable layer generally has a thickness from 5 to 15 μm, preferably about 10 μm, the first intermediate layer has a thickness from 5 to 20 μm, preferably about 12 μm, the second intermediate layer has a thickness from 5 to 30 μm, preferably about 15 μm, the barrier layer has a thickness from 3 to 10 μm, preferably about 5 to 6 μm, the third intermediate layer has a thickness from 5 to 20 μm, preferably about 11 μm, and the abuse-resistant layer has a thickness from 3 to 10 μm, preferably about 4 μm.

In general, the film of the present invention will have a total thickness from 40 to 120 μm, preferably 50 to 90 μm and more preferably about 60 μm.

In this specification and the accompanying claims:

The term "linear low density polyethylene" (LLDPE) refers to copolymers of ethylene with one or more comonomers selected from $C_4$–$C_{10}$ alpha olefins such as but-1-ene, oct-1-ene and hex-1-ene: the polymer molecules comprise long chains with few branches. The specific gravity is generally from 0.916 to 0.925 and will generally depend on the comonomer content.

The term "very low density polyethylene" (VLDPE) refers to linear polyethylene polymers similar to LLDPE but having generally lower specific gravities, for example of 0.915 to 0.860 or lower.

The term "ethylene-vinyl acetate copolymer" (EVA) refers to a copolymer formed from ethylene and vinyl acetate monomers wherein the ethylene units are present in a major amount and the vinyl acetate units are present in a minor amount.

The term "ionomer" refers to, for example, a copolymer of ethylene with a copolymerisable ethylenically unsaturated acidic monomer, usually an ethylenically unsaturated carboxylic acid, which may be di- or mono basic but is generally mono-basic, for example acrylic or methacrylic-acid, in its ionised rather than its free acid form, the neutralising cation being any suitable metal ion for example an alkali metal ion, zinc ion or other multivalent metal ion. Surlyn is a Trademark of a suitable ionomer marketed by Du Pont.

Adhesive or tie layers in the films of the present invention to aid adhesion of adjacent layers can be any of those known to be useful in adhering adjacent layers of coextruded films. Suitable adhesive layers comprise, for example, chemically modified ethylene polymers for example, copolymers of ethylene with esters of ethylenically unsaturated carboxylic acids, such as alkyl acrylates or methacrylates, graft copolymers of maleic acid or anhydride onto ethylene vinyl acetate copolymers, graft copolymers of fused ring carboxylic anhydrides onto polyethylene, resin mixtures of these and mixtures with polyethylene or copolymers of ethylene and alpha olefin. Such materials include adhesives sold under the tradename Bynel (Du Pont) or Admer (Mitsui).

The heat-sealable layer used in the film of the present invention may be any conventional heat-sealable layer. Such a layer may for example be a VLDPE, LLDPE, ethylene vinyl acetate copolymer, or ionomer (for example Surlyn), ethylene acrylic acid (EAA), ethylene methacrylic acid (EMAA), ethylene propylene copolymer, or ethylene butyl acrylate copolymer layer. In a preferred embodiment, a VLDPE heat-sealable layer is used.

The abuse-resistant layer in the film of the invention may be any conventional type of such layer, for example an ethylene vinyl acetate copolymer, VLDPE, copolyamide, LLDPE, ionomer (e.g. Surlyn) or EMAA layer. In a particular embodiment, the abuse-resistant layer is an ethylene vinyl acetate copolymer layer, preferably having a vinyl acetate content of about 9%.

It will be understood that blends of resins may be used in place of individual resins in the various layers of the laminates of the invention, particularly in the heat-sealable and abuse-resistant layers.

Where a core or intermediate layer or layers is present between the heat-sealable and barrier layers, this may for example be an ethylene vinyl acetate copolymer, ethylene butyl acrylate copolymer, or EMAA layer. In a particular embodiment, a core layer of ethylene vinyl acetate copolymer, preferably having a vinyl acetate content of about 9% is used for example in the four- or five-layer structure described above.

In the six-layer structure described above, the two intermediate or core layers between the heat-sealable and barrier layer may in a specific embodiment, both be ethylene vinyl acetate layers. In this embodiment, preferably the first intermediate or core layer, which is adjacent to the heat-sealable layer, comprises 18% vinyl acetate, and the second intermediate or core layer, which is adjacent to the barrier layer, comprises about 9% vinyl acetate.

Where an intermediate layer is present between the barrier layer and the abuse-resistant layer, such as in the five- or six-layer structure described above, the intermediate layer may comprise, for example, VLDPE. It will be appreciated that in some cases where an intermediate or core layer of VLDPE is present this may not bond satisfactorily to some abuse-resistant layers, such as an ionomer layer, without the use of an adhesive or tie layer. In such cases, it will be appreciated that it may be necessary either to use a separate tie layer, for example comprising an acid modified ethylene vinyl acetate copolymer, or to use in the core or intermediate layer a blend of VLDPE and such a modified ethylene vinyl acetate copolymer. The EVA copolymer may be modified with, for example, maleic anhydride.

The invention further provides a method of producing a film which comprises extruding a blend according to the invention to form a film and, optionally, orienting and/or cross-linking the film.

The film may be produced using conventional techniques for the extrusion and lamination of the film.

Multilayer films may be produced by co-extrusion and optionally cross-linked by irradiation. In a preferred embodiment however one or more layers of a multilayer film (the substrate) are extruded or co-extruded and subsequently cross-linked by irradiation; and the barrier layer and any further layers are then extruded co-extruded onto the substrate.

In a specific embodiment, using a tubular extruder a heat-sealable layer and, any intermediate layers present between the heat-sealable layer and the barrier layer are co-extruded and these layers are then irradiated by electron bombardment to provide cross-linking and increase the strength of the extruded layers. Generally, the irradiation is performed using high energy electrons to provide a dosage of from 1 to 10 MRad, preferably 3 to 7, for example about 4.5 MRad. Cross-linking may also be effected in known manner using chemical cross-linking agents.

After irradiation, the barrier layer and remaining layers of the film, including the abuse-layer, are extruded onto the irradiated layers (or substrate).

The film is then preferably oriented biaxially, (for example, by a factor from 3 to 5) in both the machine and transverse directions. Orientation may, for example, be effected by the known trapped bubble technique which is well-known in the art. The extruded tubular film is cooled and collapsed. The tubular film is subsequently fed through a bath of hot water and, as it leaves the hot water it is inflated and blown into thin tubing. The tubular film is rapidly cooled and then rolled-up for further processing. Alternatively the film may be oriented by stretching on a tenter frame. Preferably the orientation is carried out at a temperature from 85° to 100° C., more preferably 90° to 95° C. Heat shrinkable films according to the invention are preferred.

Alternatively, a cross-linked film may be produced by irradiation of the whole film from both sides.

As a further alternative, a cross-linked film may be produced by selective irradiation of the whole film from one side, for example the abuse-resistant layer side. This provides a higher degree of cross-linking in one side, for example in the abuse-resistant layer, and a lower degree of cross-linking in the other side, for example in the heat sealable layer.

Alternatively non-heatshrinkable non-oriented films may be produced according to the present invention.

The film of the invention may be used to form a package in conventional manner. For example, when the film is produced as a tubular film, bags can be formed by transverse sealing and cutting across the flattened tubular film to make individual bags. Alternatively, bags may be made by slitting the tubular film along one edge and then transversely sealing and severing the film to produce bags. Other methods of making bags and packages are known and may be readily adapted to use with the multilayer films of the invention.

A package or bag formed from a film according to the present invention may for example be used to package cheese or processed meat. Barrier films according to the present invention preferably have an oxygen permeability from 120 to 375 cm$^3$/24hr/bar at 0% relative humidity and 23° C. and a carbon dioxide permeability from 450 to 1850 cm$^3$/m$^2$/24hr/atm at 0% relative humidity at 23° C.

The present invention will now be described in more detail with particular reference to the following Examples:

EXAMPLES

Examples 1–4

Blends were prepared from mixtures of 51–62% vinylidene chloride-vinyl chloride copolymer (22% vinyl chloride content, average molecular weight 110,000), 30% vinylidene chloride-methyl acrylate copolymer (8.5% methyl acrylate content, average molecular weight 110,000), 4% epoxidised soyabean oil and 4–15% of the CO-modified ethylene vinyl acetate copolymer Elvaloy 742 (average molecular weight 230,000, melt flow index 2.9 at 125° C.) by the following procedure:

The vinylidene chloride copolymers were charged in a small scale (25 kg) high shear mixer and heated with mixing (250 rpm) to 60° C. under reduced pressure. Epoxidised soyabean oil, at 115° C. was sprayed into the mixer and as the blend was mixed the temperature was allowed to rise to 72° C. The blend was then allowed to cool to 40°–45° C. before adding the solid CO-modified copolymer additive which was dry mixed with the blend.

The exact proportion of CO-modified copolymer in each case is shown in Table 1.

Multilayer films comprising the blends were prepared by co-extrusion of a heat-sealable layer (VLDPE, specific gravity of 0.911) and an intermediate layer (ethylene vinyl acetate, 9% VA content) to provide a substrate. This substrate was then irradiated by electron bombardment using high energy electrons (4.5 MRad) to provide crosslinking. After irradiation, a layer of the barrier blend described above, and an abuse-resistant layer (ethylene vinyl acetate, 9% VA content) were extruded onto the substrate.

The films were then oriented biaxially in both machine (M) and transverse (T) directions by a factor of 3.6 (T) and 3.0 (M). Orientation was performed by cooling and collapsing the extruded tubular film, feeding the film through a hot water bath (90°–95° C.), inflating the film and blowing into thin tubing. The films were then rapidly cooled and rolled-up for further processing.

The thickness of the layers in the final multilayer films were as follows:

| | |
|---|---|
| Heat-sealable layer | 10 μm |
| Intermediate layer | 28 μm |
| Barrier layer | 6 μm |
| Abuse-resistant layer | 15 μm |

The total thickness of the films was 59 μm.

The permeabilities of the films to $O_2$ and $CO_2$ are shown in Table 1. The films also show good optical properties as judged by Haze both before and after shrink, which are also shown in Table 1. Shrunk samples for Haze determination were allowed to shrink freely, while-held flat between two wire mesh sheets, in water at 85° C. for 5 minutes. The samples were then cooled in water at ambient temperature and then dried. Haze was measured by the procedure of ASTM-D-1003, method A using a laboratory Hazemeter.

Example 5

A blend was prepared by a procedure analogous with Examples 1–4 using 51% vinylidene-vinyl chloride, 30% vinylidene chloride-methylacrylate, 4 epoxidised soyabean oil and 15% of Co-modified ethylene vinylacetate copolymer, Elvaloy 741A available from Du Pont (melt flow index 35 at 190° C.). A multi-layer film incorporating the blend was produced in accordance with the procedure described in Examples 1–4 and the permeability and haze of the film are shown in Table 1.

Example 6

A blend was prepared by analogy with the procedure of Examples 1–4 but using 51% vinylidene chloride-vinyl chloride copolymer, 30% vinylidene chloride-methylacrylate copolymer, 4% epoxidised soyabean oil and 15% of a CO-modified ethylene butyl acrylate copolymer, Elvaloy HP441, available from Du Pont (melt flow index 7.5 at 190° C.). A multi-layer film, incorporating the blend, was produced in accordance with the procedure of Examples 1 to 4 and the permeability and haze of the film are shown in Table 1.

Comparative Example 1

A blend was prepared by a procedure analogous to that of Examples 1–4 using 60% vinylidene chloride-vinyl chloride copolymer, 30% vinylidene chloride-methyl acrylate copolymer and 10% epoxidised soyabean oil: no solid additive was added to the blend. After blending, to obtain satisfactory homogeneity it was necessary to perform a delumping operation using a crushing procedure.

A multi-layer film incorporating the blend was produced by a procedure analogous to that of Examples 1–4.

The permeabilities of the film thus produced are shown in Table 1.

Comparative Examples 2 to 4

Blends were prepared by a procedure analogous to that of Example 1–4 using 51% vinylidene chloride-vinyl chloride, 30% vinylidene chloride-methylacrylate copolymer, 4% epoxidised soyabean oil and 15% of a solid additive chosen as follows:

| | |
|---|---|
| Comparative Example 2: | ethylene:vinylacetate (82:18), melt flow index 0.7 (at 190° C.). |
| Comparative Example 3: | ethylene:ethyl acrylate:glycidyl methacrylate (68:25:7), melt flow index 4.0 (at 1.90° C.). |
| Comparative Example 4: | ethylene: vinyl acetate (55:45), melt flow index 2.5 (at 190° C.). |

Multi-layer films incorporating the blends were produced accordance to the procedure of Example 1–4 and the permeability and haze properties of the films are shown in Table 1.

The films may be directly compared with those of Examples 4, 5 and 6 which also contain 15% solid additive. Examples 4, 5 and 6 and particularly Example 4 show a permeability which is higher than that of Comparative Examples 2 and 3 and show improved optical properties compared to comparative Example 3. Comparative Example 4 has the disadvantage that the solid additive leads to processing disadvantages in that it is difficult to handle, becoming soft and sticky at slightly elevated temperature and is not a free flowing powder.

TABLE 1

| EXAMPLE | % SOLID ADDITIVE | PERMEABILITY ($cm^3/m^2/$ 24hr/bar) | HAZE BEFORE SHRINK | HAZE AFTER SHRINK |
|---|---|---|---|---|
| 1 | 4 | 110 | 484 | 2.9 | 7.1 |
| 2 | 8 | 185 | 870 | 3.1 | 7.9 |
| 3 | 12 | 330 | 1,611 | 4.1 | 8.3 |
| 4 | 15 | 420 | 2,020 | 4.3 | 12.5 |
| 5 | 15 | 280 | 1,635 | 3.2 | 13.3 |
| 6 | 15 | 250 | 1,320 | 3.6 | 17.3 |
| C1 | 0 | 315 | 1,728 | N.D. | N.D. |
| C2 | 15 | 75 | 430 | 3.4 | 14.3 |
| C3 | 15 | 140 | 760 | 4.4 | 23.9 |
| C4 | 15 | 240 | 1,160 | 3.8 | 12.2 |

N.D. - Not Determined

We claim:

1. A film comprising:
   a) an abuse-resistant layer;
   b) a heat-sealable layer; and
   c) disposed between said abuse-resistant layer and said heat-sealable layer, a barrier layer comprising
      1) a vinylidene chloride/vinyl chloride copolymer, a vinylidene chloride/methyl acrylate copolymer, or a mixture of the foregoing,
      2) based on 100 parts of said copolymer, from 2 to 20 parts by weight of a terpolymer including mer units derived from ethylene, carbon monoxide, and either vinyl acetate or a $C_1$–$C_4$ alkyl acrylate, and
      3) based on 100 parts of said copolymer, up to about 5 parts by weight of a liquid plasticizer, said film having a carbon dioxide transmission rate greater than the oxygen transmission rate of said film.

2. The film of claim 1 wherein said barrier layer comprises a blend of from 50 to 80 weight percent of a vinylidene chloride/vinyl chloride copolymer and from 20 to 50 weight percent of a vinylidene chloride/methyl acrylate copolymer.

3. The film of claim 2 wherein said barrier layer comprises a blend of from 60 to 70 weight percent of a vinylidene chloride/vinyl chloride copolymer and from 30 to 40 weight percent of a vinylidene chloride/methyl acrylate copolymer.

4. The film of claim 1 wherein said vinylidene chloride/vinyl chloride copolymer comprises from 15 to 30 weight percent mer units derived from vinyl chloride and from 70 to 85 weight percent mer units derived from vinylidene chloride.

5. The film of claim 1 wherein said vinylidene chloride/methyl acrylate copolymer comprises from 6.5 to 9.5 weight percent mer units derived from methyl acrylate and from 90.5 to 93.5 weight percent mer units derived from vinylidene chloride.

6. The film of claim 1 wherein said terpolymer is present in an amount of from 4 to 15 parts by weight.

7. The film of claim 6 wherein said terpolymer is present in an amount of from 8 to 14 parts by weight.

8. The film of claim 1 wherein said terpolymer includes mer units derived from ethylene, carbon monoxide, and vinyl acetate.

9. The film of claim 8 wherein said terpolymer comprises from 18 to 40 weight percent mer units derived from vinyl acetate.

10. The film of claim 9 wherein said terpolymer comprises from 25 to 30 weight percent mer units derived from vinyl acetate.

11. The film of claim 1 wherein said terpolymer comprises from 7 to 12 weight percent mer units derived from carbon monoxide.

12. The film of claim 11 wherein said terpolymer comprises from 8 to 10 weight percent mer units derived from carbon monoxide.

13. The film of claim 1 wherein said terpolymer includes mer units derived from ethylene, carbon monoxide, and a $C_1$–$C_4$ alkyl acrylate.

14. The film of claim 13 wherein said terpolymer comprises from 18 to 40 weight percent mer units derived from said $C_1$–$C_4$ alkyl acrylate.

15. The film of claim 14 wherein said terpolymer comprises from 25 to 30 weight percent mer units derived from said $C_1$–$C_4$ alkyl acrylate.

16. The film of claim 1 wherein said liquid plasticizer is epoxidized soybean oil, epoxidized linseed oil, dibutyl sebacate, or glycerol monostearate.

17. The film of claim 1 wherein said film is heat shrinkable.

18. The film of claim 1 further comprising an intermediate layer disposed between said heat-sealable layer and said barrier layer.

19. The film of claim 18 further comprising a second intermediate layer disposed between said abuse-resistant layer and said barrier layer.

20. The film of claim 1 wherein said film has a total thickness of from 40 to 120 $\mu$m.

* * * * *